(12) United States Patent
Anderson

(10) Patent No.: US 12,050,735 B2
(45) Date of Patent: Jul. 30, 2024

(54) TOUCHLESS ENGAGEMENT SYSTEM

(71) Applicant: MESA, LLC, Midland, MI (US)

(72) Inventor: Tracy L Anderson, Midland, MI (US)

( * ) Notice: Subject to any disclaimer, the term of this patent is extended or adjusted under 35 U.S.C. 154(b) by 0 days.

(21) Appl. No.: 18/076,784

(22) Filed: Dec. 7, 2022

(65) Prior Publication Data
US 2024/0152211 A1 May 9, 2024

Related U.S. Application Data

(60) Provisional application No. 63/287,018, filed on Dec. 7, 2021.

(51) Int. Cl.
*G06F 3/01* (2006.01)
*G06F 3/16* (2006.01)

(52) U.S. Cl.
CPC .............. *G06F 3/017* (2013.01); *G06F 3/167* (2013.01)

(58) Field of Classification Search
CPC .................................. G06F 3/017; G06F 3/167
See application file for complete search history.

(56) References Cited

U.S. PATENT DOCUMENTS

| | | | | |
|---|---|---|---|---|
| 2010/0306715 A1* | 12/2010 | Geisner | ................... | G06F 3/014 345/157 |
| 2011/0216059 A1* | 9/2011 | Espiritu | .................. | G06T 19/00 345/473 |
| 2017/0277684 A1* | 9/2017 | Dharmarajan Mary | ..................... | G10L 13/00 |
| 2018/0157333 A1* | 6/2018 | Ross | ....................... | G06F 3/013 |
| 2018/0232504 A1* | 8/2018 | Bradley | ................ | G06F 21/316 |
| 2020/0129106 A1* | 4/2020 | Arbel | ...................... | G06F 3/017 |
| 2021/0409464 A1* | 12/2021 | Varon-Weinryb | .......................... | H04L 65/1069 |
| 2022/0362680 A1* | 11/2022 | Stafford | ................ | A63F 13/428 |
| 2023/0157757 A1* | 5/2023 | Braido | .................. | G06T 19/003 345/419 |

* cited by examiner

*Primary Examiner* — Dmitriy Bolotin
(74) *Attorney, Agent, or Firm* — Robert Cantrell; Jose Jimenez; JIMENEZ LAW FIRM

(57) ABSTRACT

Disclosed is a touchless engagement system for a user having at least one computer processor and user interface operable with at least one memory storage medium on which operates a gesture-reading software platform, an access portal, and at least one data collection software program. The system includes at least one digital display. The system includes at least one motion sensing input interface has at least one RGB camera assembly and at least one infrared projector and detector assembly. At least one gesture-reading software platform is designed to assess the user within a selected physical area via the motion sensing input. A data collection software program is designed to collect data about at least one or more of user gestures, user commands, data retrieved because of commands, and identifiers, and assess data for user needs. The system may display advertisement, textual information, and statistics, and offers one or more command pathways.

20 Claims, 11 Drawing Sheets

600A

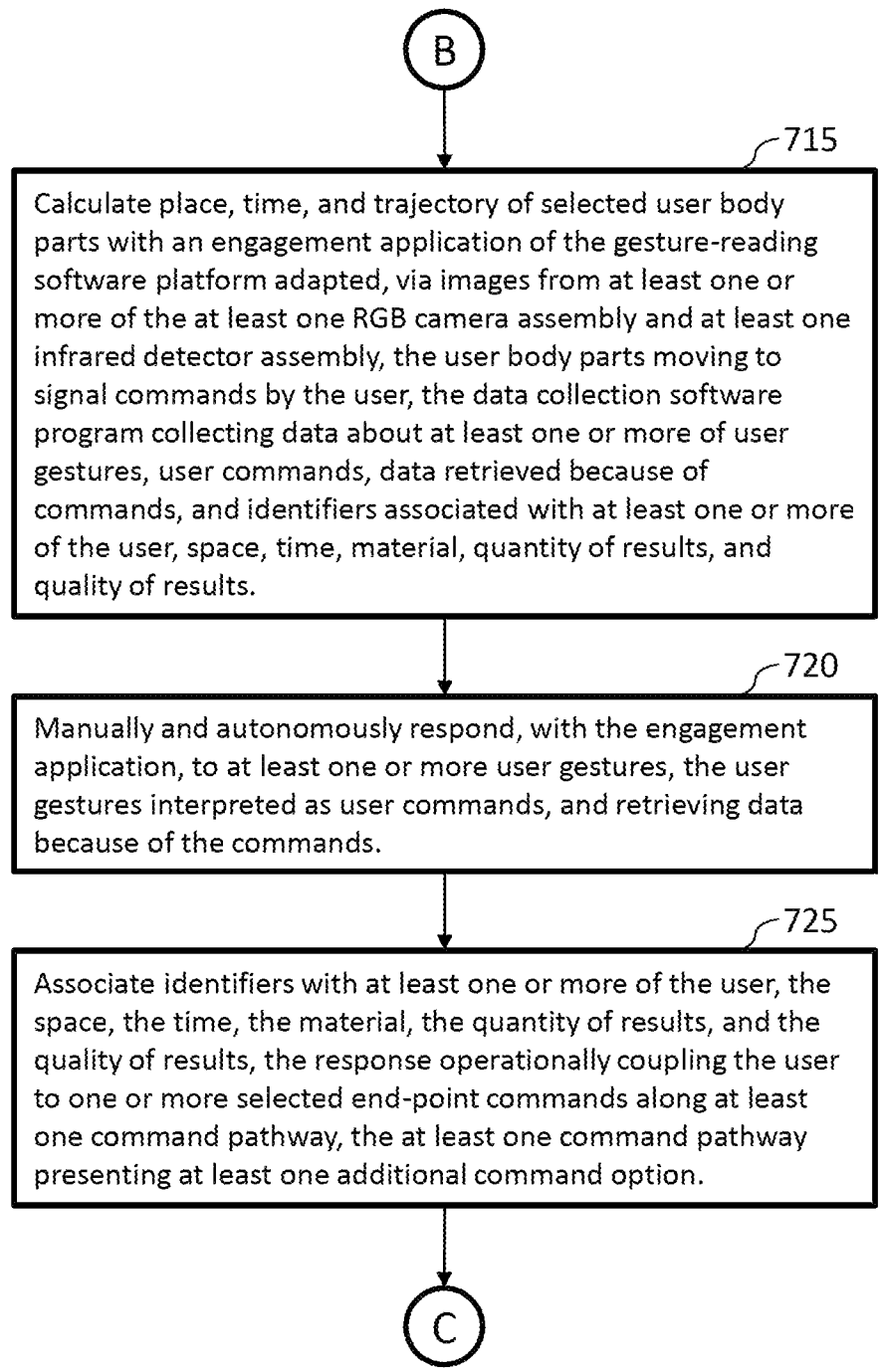

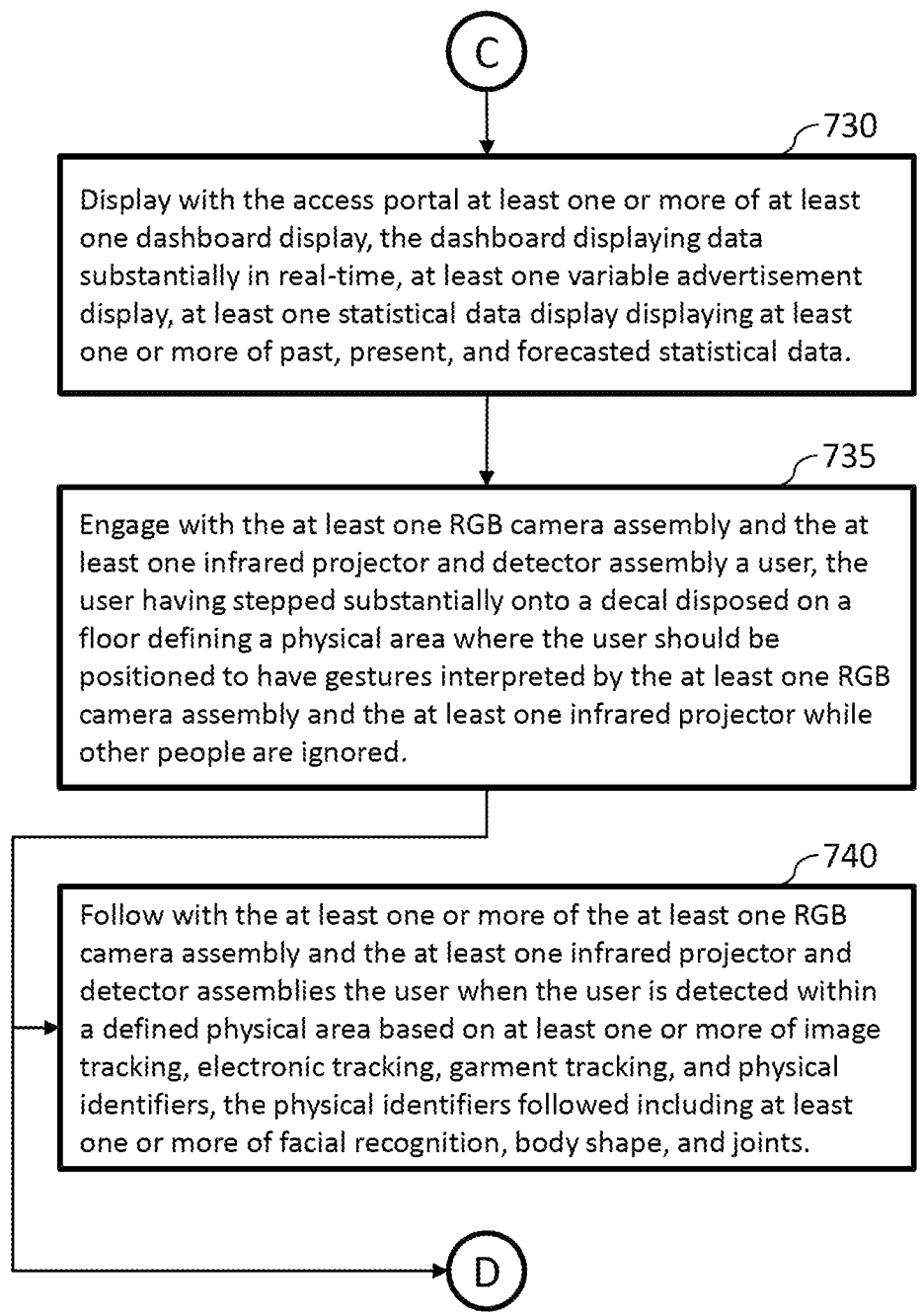

TOUCHLESS ENGAGEMENT SYSTEM

CLAIM OF PRIORITY

This application is a continuation-in-part of U.S. provisional application with Ser. No. 63/287,018, filed on Dec. 7, 2022, which is incorporated herein by reference in its entirety.

FIELD OF THE INVENTION

The inventive concept relates generally to a touchless engagement system for user interaction.

BACKGROUND

Currently, businesses can track engagement data of users on computer systems through online sources such as Websites and social media. However, businesses lack data from which to analyze the habits and preferences of people who engage systems, including message and information presented by systems, in foot-traffic areas. People are bombarded with unwanted messaging and may desire, therefore, to disengage with the system or to otherwise minimize that engagement. Many such systems require physical contact with the system, which can lead to contact with harmful bacteria and viruses. The need to make physical contact with a system can repel some people from using those systems or require added measures to keep those systems clean, these measures themselves communicating to people that there may be a danger inherent with using those systems or using them any more than necessary. Therefore, there is a need in the marketplace for an improved engagement system wherein touching of the system by a given user is unneeded.

SUMMARY OF THE INVENTION

Disclosed is a touchless engagement system for a user having at least one computer processor and user interface operable with at least one memory storage medium on which operates a gesture-reading software platform, an access portal for administrators accessible from at least one Web browser, and at least one data collection software program. Collected data is classified and analyzed to tailor information that is presented to users during use so that information addresses apparent user needs substantially in real-time. At least one digital display is operationally coupled to the at least one computer processor and user interface. At least one motion sensing input interface has at least one RGB camera assembly and at least one infrared projector and detector assembly, the at least one RGB camera assembly and at least one infrared projector and detector assemblies operationally coupled to the at least one computer processor and user interface, the at least one gesture-reading software platform designed to detect the user within a selected physical area imageable by the at least one RGB camera assembly and the at least one infrared projector and detector assembly.

An engagement application of the gesture-reading software platform is designed, via images from at least one or more of the at least one RGB camera assembly and at least one infrared detector assembly, to calculate place, time, and trajectory of selected user body parts, the user body parts moved to signal commands by the user, the data collection software program designed to collect data about at least one or more of user gestures, user commands, data retrieved because of commands, and identifiers associated with at least one or more of the user, space, time, material, quantity of results, and quality of results.

The access portal has at least one or more of at least one dashboard display designed to display data substantially in real-time, at least one variable advertisement display, and at least one statistical data display designed to display at least one or more of past, present, and forecasted statistical data. The engagement application is designed to at least one or more of manually and autonomously respond to at least one or more user gestures, user commands, data retrieved because of commands, and identifiers associated with at least one or more of the user, the space, the time, the material, the quantity of results, and the quality of results, the response operationally coupling the user to one or more selected end-point commands along at least one command pathway, the at least one command pathway presenting at least one additional command option. The inventive concept allows gestures to initiate commands including those that might otherwise require a mouse or keyboard.

In one embodiment of the touchless engagement system, the at least one or more of the at least one RGB camera assembly and the at least one infrared projector and detector assembly are designed to follow the user detected within a defined physical area based on at least one or more of image tracking, electronic tracking, garment tracking, and physical identifiers, the physical identifiers including at least one or more of facial recognition, body shape, and joints.

In one embodiment of the touchless engagement system, the engagement application is further designed to respond to voice commands.

In one embodiment of the touchless engagement system, the collected data includes at least one or more of demographics, facial recognition, and location.

The inventive concept now will be described more fully hereinafter with reference to the accompanying drawings, which are intended to be read in conjunction with both this summary, the detailed description, and any preferred and/or particular embodiments specifically discussed or otherwise disclosed. This inventive concept may, however, be embodied in many different forms and should not be construed as limited to the embodiments set forth herein; rather, these embodiments are provided by way of illustration only and so that this disclosure will be thorough, complete, and will fully convey the full scope of the inventive concept to those skilled in the art.

BRIEF DESCRIPTION OF THE DRAWINGS

FIGS. 7A-7D illustrates a touchless engagement method for a user.

DETAILED DESCRIPTION OF THE INVENTION

Figure 1:
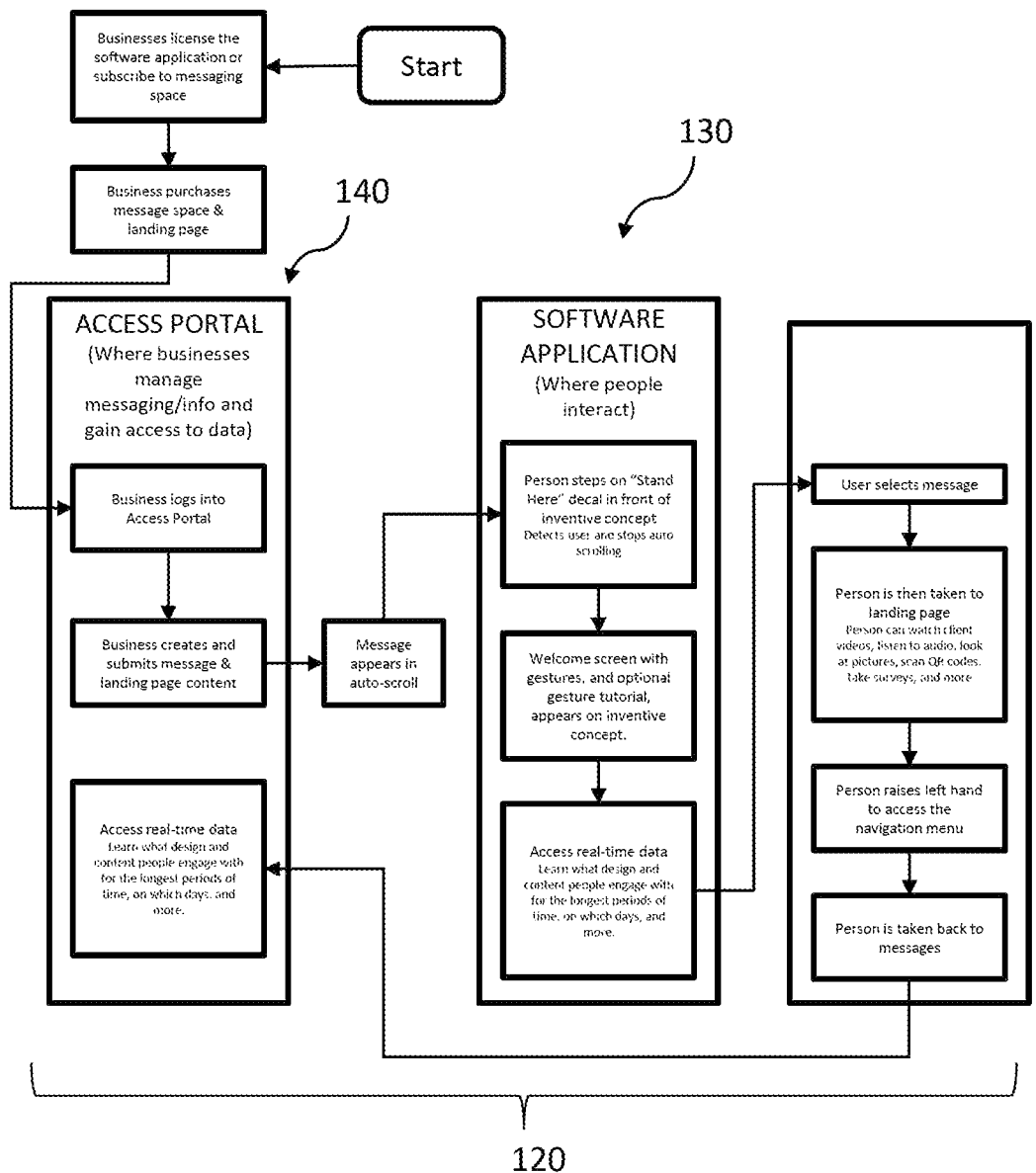
FIG. 1 illustrates a representative touchless engagement system.
Figure 2:
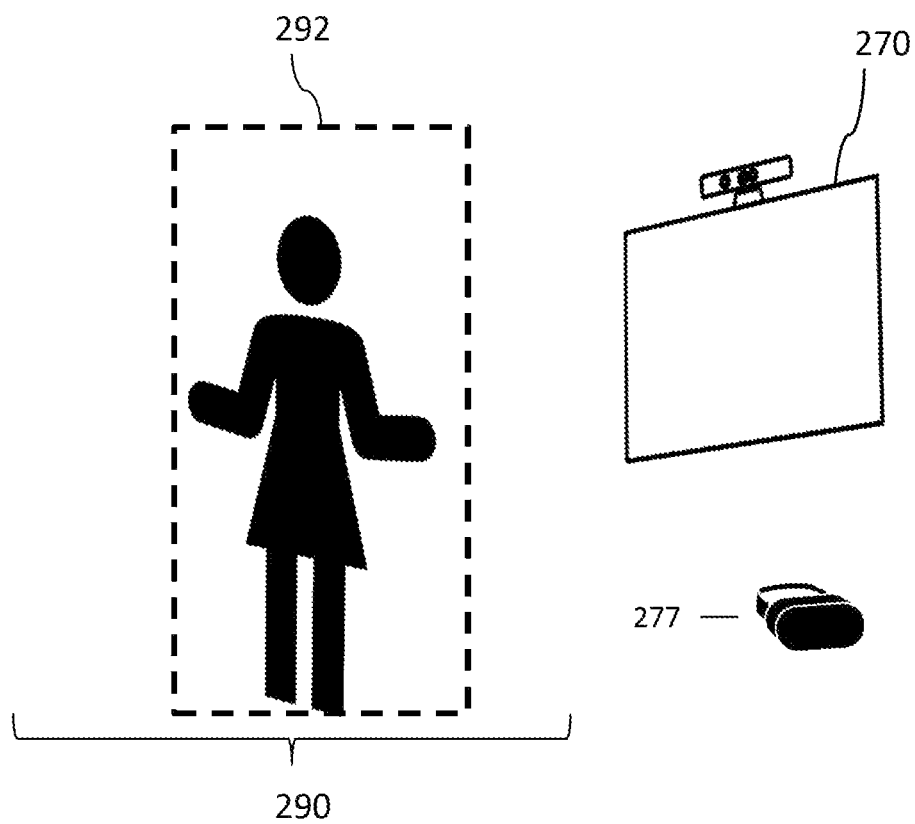
FIG. 2 illustrates a representative touchless engagement system installation.
Figure 3:
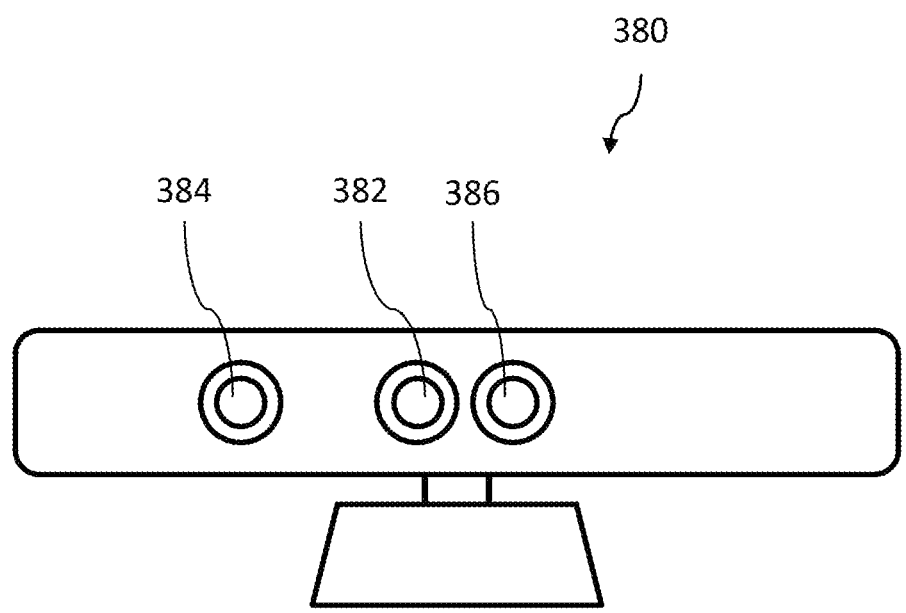
FIG. 3 illustrates a representative motion sensing input interface.
Figure 4:
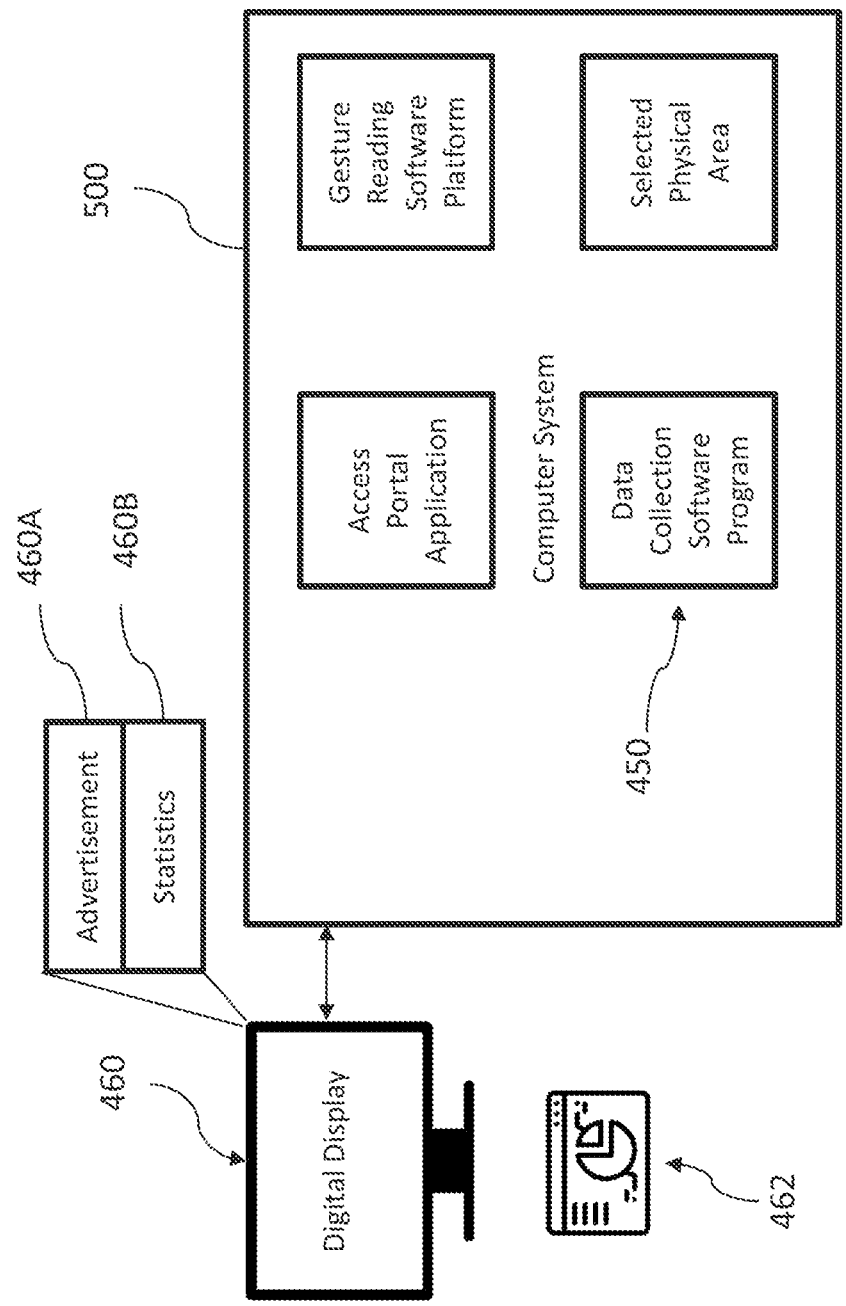
FIG. 4 illustrates representative portal elements.

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

The inventive concept allows people to engage with resources, messages, and information using hand gestures of users while tracking and presenting data in real-time for administrators. One representative embodiment of the inventive concept is a substantially two-part software system. One part is an engagement application. The engagement application allows people to engage with messages and information through hand motions and other gestures and, therefore, creates a touchless way for a person to engage with a computer system. The engagement application is loaded onto, in one embodiment, a local computer operably coupled to the Internet and a Microsoft Kinect system. Another embodiment uses the Orbbec Astra Stereo S U3. Other body-sensor systems may be used, the inventive concept designed to work with a plurality of body-sensor system types. For example, an embodiment could include Intel RealSense. The engagement application software displays messages, in various configurations, depending on the size of an associated user interface. The user interface display is maintained until a person enters an interactive window. This interactive window is marked by a decal or other marking on the floor indicating where to stand, the marking establishing the best-fit location for a user to engage with the engagement application. Until such interaction begins, the system scrolls or otherwise displays a standard message or series of messages.

To take control of the engagement application, a person, as the user, must be present before the user interface and must be present within a zone denoted by the decal or other marking or by other means to track specific users. In this way, the inventive concept will interpret gestures from the user while ignoring other nearby people. The inventive concept could be established to read up to four people at a time, and the inventive concept may include even more in other embodiments. The inventive concept could be set up to follow a particular person in a space once engaged based on image tracking, electronic tracking, and leverage identifiers such as facial recognition, body shape, joints, and other such identifiers. Continuity may also be used, meaning that once detected, the system can be designed to follow a given person as the user within the scope of detection.

In the representative embodiment, the given user can learn gestures through a short tutorial prior to beginning an engagement. Such gestures include how to move an at least one screen assembly left and right, controlling screens, dragging, moving, via movements of the user's hand in a way comparable to a mouse. To initiate some embodiments of the inventive concept, the starting gesture involves raising a hand up to get the inventive concept started. A raised hand allows for screen mobility, for example, moving the screen right or left, controlling the screen assembly, dragging and moving, actions emulating the use of a mouse or a touch screen. Some embodiments may allow for voice commands though the emphasis of the inventive concept is on gestures. In one embodiment, the Microsoft Kinect system offers the base software and hardware platform. Kinect, in some embodiments, involves the Microsoft Azure Software Development Kit (SDK) programming platform connected to Microsoft Windows. Other programming platforms may be used. Each embodiment, as illustrated, may use various body-sensor systems, and each involves a specific Software Development Kit (SDK) program platform that is connected to Microsoft Windows.

A software development kit (SDK), used in the representative embodiment, is a collection of software development tools in one installable package. SDK facilitates the creation of applications by having a compiler, debugger, and perhaps a software framework. Software development is the process of conceiving, specifying, designing, programming, documenting, testing, and bug-fixing involved in creating and maintaining applications, frameworks, and other software components. Software development involves writing and maintaining the source code, but in a broader sense, SDK includes all processes from the conception of the desired software through to the final manifestation of the software, typically in a planned and structured process. Software development tools are normally specific to a hardware platform and operating systems combination. To create applications with advanced functionalities such as advertisements and push notifications.

In some embodiments, a cable is designed to connect a Windows-based operating system via HDMI connecting at least one or more of a computer and a TV with associated camera assemblies aimed toward the user from the at least one or more of a computer and a TV. Other embodiments may use other computer operating systems. Some embodiments may use specialized operating systems such as operating systems of smart TVs. Embodiments may use other connector systems in place of HDMI such as USB, firewire, Wi-Fi, and Bluetooth. Substantially any screen assembly of substantially any size may be used, providing a camera assembly can view the user from the perspective of the at least one screen. In some embodiments, to illustrate, the at least one screen assembly could be technology such as glasses, contact lenses, augmented reality, virtual reality, mixed reality, integrated technology, and holograms. For example, rather than interface with a conventional screen assembly, the user may wear glasses or headsets through which a screen or other user interface object is viewable, for example, a three-dimensional rendering of an advertisement.

In representative embodiments, the inventive concept incorporates many gestures such as grab and scroll. Given users may skip the tutorial and jump straight to regular engagement. Given users can navigate the software by 1) manually scrolling through and selecting messages to reveal landing pages with more information such as text, audio, video, slideshows, photo galleries, interactive surveys, scan QR codes, and other information; and 2) allowing people to access a previous screen, gesture instructions, and category and alphabetic search options from the navigation menu (activated by raising the left hand—with the right hand used in other embodiments or other body parts such as for disabled persons). Given users can access gesture instructions through a help menu located on each screen or via instructions printed on the floor marking. Once the given user has finished engaging with the engagement application system, the given user walks away and the automatically scrolling messages return. Interaction and display data is collected from the inventive concept and reported on an access portal accessible from at least one Web browser.

The access portal, in representative embodiments, allows businesses displaying messages to access data substantially in real-time and to change messages to align with the apparent interests of users. In the preferred embodiment, message changes happen to address present use of each person without calibrating the message with past use data. The access portal has several components, including, but not limited to: 1) dashboard displays, which report substantially in real-time that the company has identified a given user for easy tracking and analysis, 2) ads, which allow businesses to create messages and publish landing page information through templates or by uploading bespoke creative designs. From ads, campaigns can be scheduled and submitted for publishing, 3) statistical data, which allows the business to access a plurality of available reports related to their message and landing page performance. Past data of given users is, therefore, retained but operationally disassociated from data generated by each present use, messages delivered to the user interface calibrated based on present data only. For example, a given user may use the inventive concept to find where to buy a good hamburger, and the inventive concept will aid the given user at finding a good hamburger without biasing its recommendation with past data that shows the user selected one particular hamburger restaurant in the past, yet the inventive concept will collect data for statistical analyses that businesses may use which show which restaurants the given user ultimately selected. Data is available in real-time. Embodiments may include administrative privileges within the access portal to allow for user and subscription management. In addition, ads published by clients may first be reviewed prior to publication to ensure appropriate content.

Representative embodiments of the gesture control technology include a user experience and a management experience. The management experience may have many levels of autonomy and various points for human input.

In representative embodiments of a method for using the touchless engagement system for a user, the system first performs a system check and an assessment of Internet availability. The system may present an initial advertisement slide until it detects a user, the user at a designated detectable location such as the decal, the advertisement selectable, therefore, based on aggregate past user data. For example, if statistics show that most users seek information about lunch at a given time, the advertisement may display general lunch options until a user is detected.

Upon detecting a user, the system may offer a tutorial to that given user, or the given user may skip the tutorial. The user executes a series of gestures including one or more from a group of side to side hand and arm movements, forward and backward hand and arm motions, and grab and release hand motions, the motions effecting at least one or more from a group of virtual lateral and horizontal movements of content pages, the activation of button, link, and tab members thereon, and the creation of text, figures, and displayed wavelength gradients thereon, the result substantially the operation of the computer interface without users touching the computer interface, the operation which at least one or more of provides a way to assess a situation, such as goods and services available, make a decision from the assessment, such as to go to a store or order a product, and act on the decision, such as to execute the order or otherwise move into a next phase of the sales cycle, the employer of the touchless engagement system for a user establishing through screens the presented user experience sought at least one or more of practically, emotionally, and morally.

A user decision cycle of assess, decide, and act, from within the presented user experience operationally interfaces with the decision cycle of the touchless engagement system for a user wherein the associated computer system assesses, decides, and acts on user motions within the encoded framework of encoded software programs therein which may further be enhanced by artificial intelligence.

Where artificial intelligence is used, machine learning may be employed to improve upon the at least one computer system's ability to assess, decide, and act on user gestures where improvement may be sought both on recognition of motions as commands and the actions taken to deliver results to users. The touchless engagement system for a user responds to user motions visually and audibly inclusive of controls of the computer interface such as lighting, music, and olfactory stimulus such as releasing a pine scent when displaying wood products.

One representative embodiment of the touchless engagement system employs decision tree strategies to determine which actions the computer system will take, for example, which of a series of potential screens to display. The touchless engagement system may employ one or more of decision trees, neural networks, Bayesian models, and genetic algorithms. The decision trees, neural networks, Bayesian models, and genetic algorithms may, in some embodiments, be derived from preset or partially preset libraries.

A machine learning program may support the touchless engagement system and is designed to, when engaged by users and on a substantially continual cycle, at least one or more of assess data from the data about and generated by the given user, recommend actions as directed by the given user, with the further aim to improve interpretation of given actions, and choose how best to respond to commands. The machine learning program adapts its performance to improve the accuracy of the at least one computer system's response for both the given user and the aggregate of users who may use the touchless engagement system, particularly where the at least one computer system has options by which it can facilitate the user experience.

Machine learning may further train to read user body language and facial expressions by which the at least one computer system of the touchless engagement system can assess the status of the individual, such as emotion, excitement, and practicalities such as being in a hurry. Such can enhance the user experience. If, for example, the given user appears to be in a hurry and seeks restaurants, the touchless engagement system can favor nearby fast food. If, as another example, the given user appears to be relaxed, and perhaps, a second affiliated person is detected nearby, the touchless engagement system can favor higher quality restaurants as might be suitable for a date. If a user makes engagement errors and appears frustrated, the touchless engagement system may offer supplementary instructions. Emotions may be read through computer assessments of face and body profiles mapped onto users when users engage the system. In some embodiments of the inventive concept, users opt-in to allow such features as facial recognition.

In some embodiments, the camera assembly may capture demographic information such as, but to limited to, gender, age, facial expression. In other embodiments, the inventive concept may provide data to administrators of the access portal such as information from a door counter that provides data from which to determine the percentage entering a facility who then engaged with the inventive concept. An administrator is a person who is at least one or more of managing, monitoring, and modifying the touchless engagement system via the access portal.

FIGS. 1-4 illustrate a representative embodiment of the disclosed touchless engagement system for a user having the at least one computer system 120 with at least one computer processor 500 and user interface operable with at least one memory storage medium 513 on which operates a gesture-reading software platform 30, the access portal for an at least one administrator 40, and at least one data collection software program 50. At least one digital display 460 is operationally coupled to the at least one computer processor 500 and user interface 70. At least one motion sensing input interface 380 has at least one RGB camera assembly 382 and at least one infrared projector 384 and detector assembly 386, the at least one RGB camera assembly 382, at least one infrared projector assembly 384, and at least one detector assembly 386 operationally coupled to the at least one computer processor 500 and user interface 70, the at least one gesture-reading software platform 130 designed to detect the user within a selected physical area 290 imageable by the at least one RGB camera assembly 382 and the at least one infrared projector assembly 384 and infrared detector assembly 386.

FIGS. 1-4 further illustrates that an engagement application of the gesture-reading software platform 130 is designed, via images from at least one or more of the at least one RGB camera assembly 382 and at least one infrared detector assembly 386, to calculate place, time, and trajectory of selected user body parts, the user body parts moved to signal commands by the user, the data collection software program 450 designed to collect data about at least one or more of user gestures, user commands, data retrieved because of commands, and identifiers associated with at least one or more of the user, space, time, material, quantity of results, and quality of results.

Figure 6A:
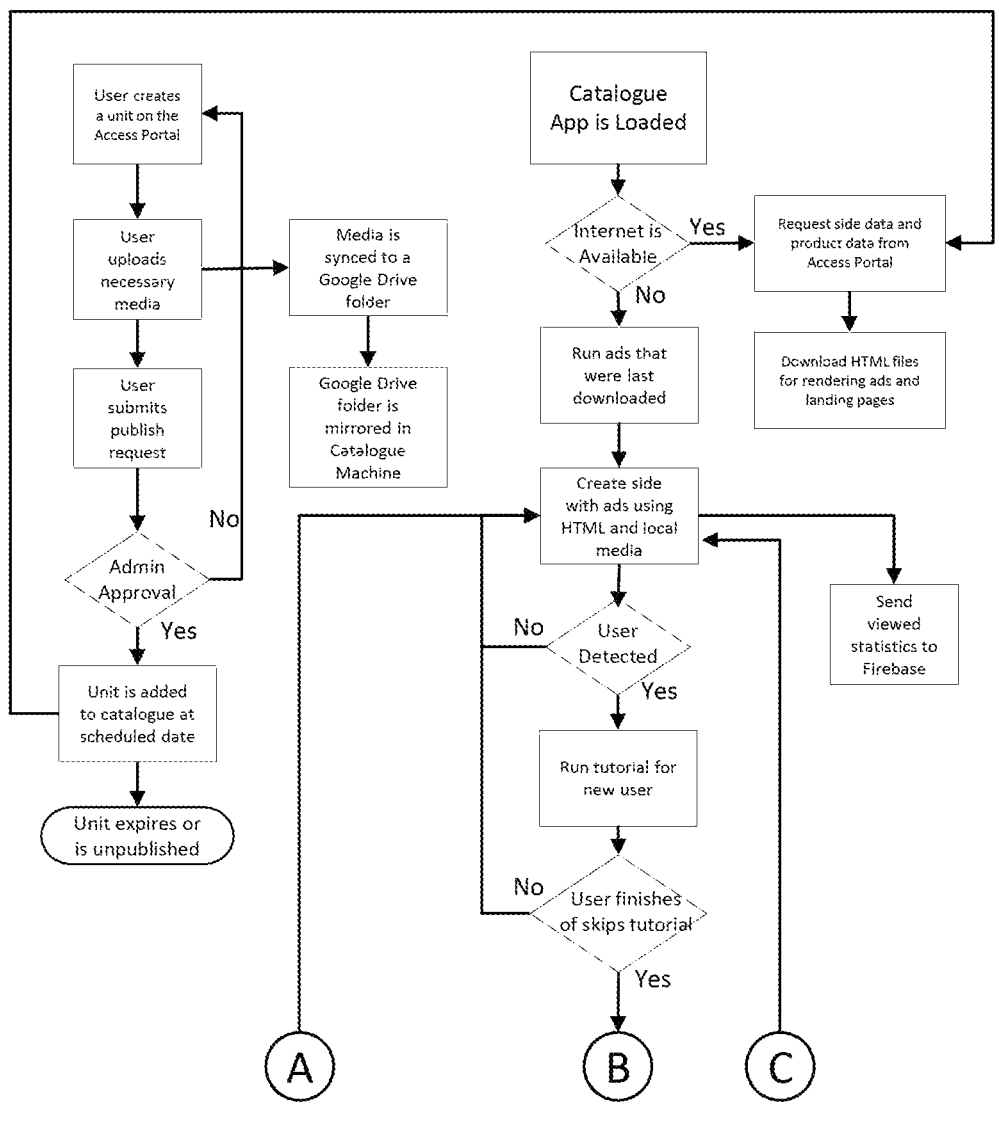
FIGS. 6A-6B illustrates a method for using the touchless engagement system.
Figure 6B:
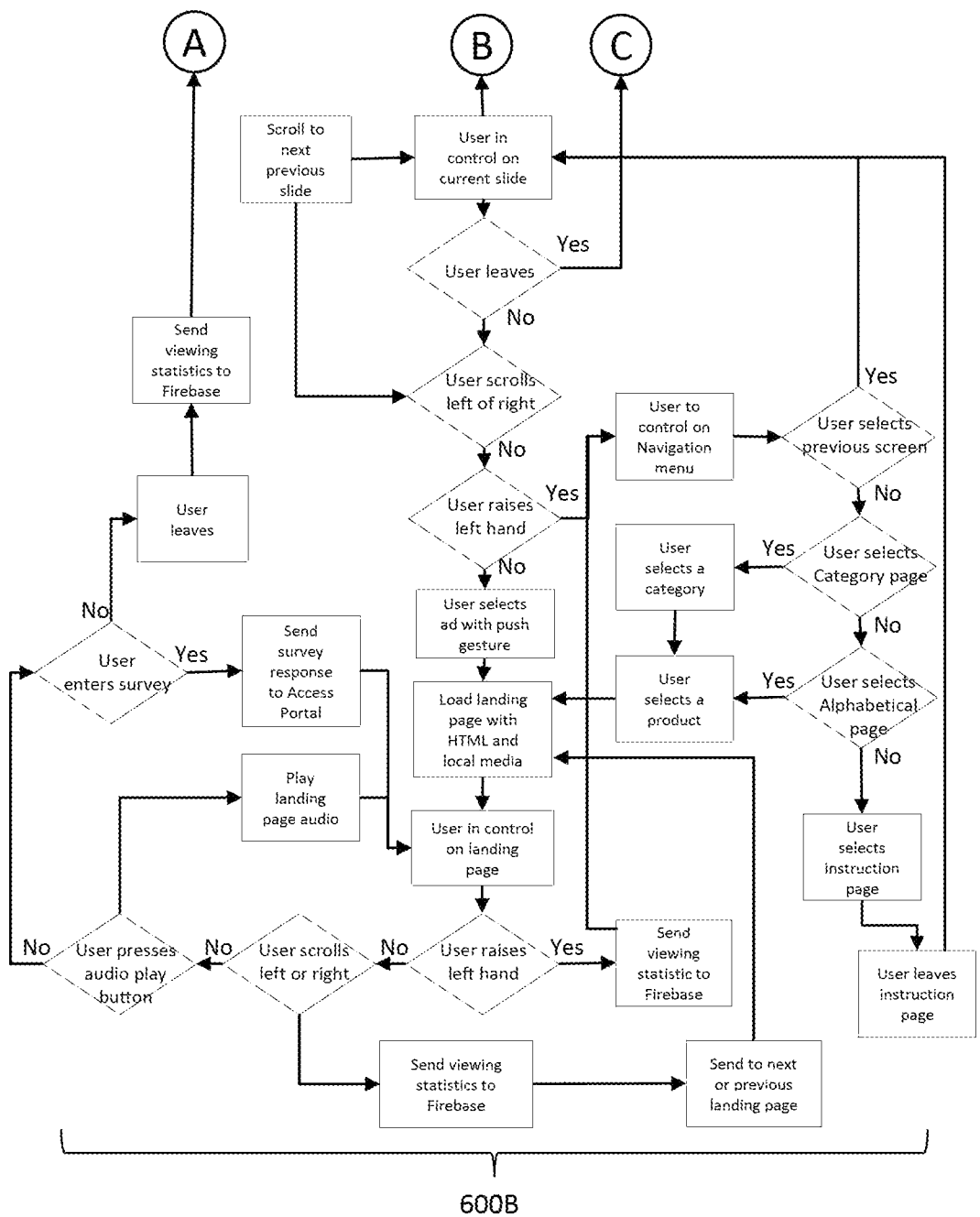
Figure 7A:
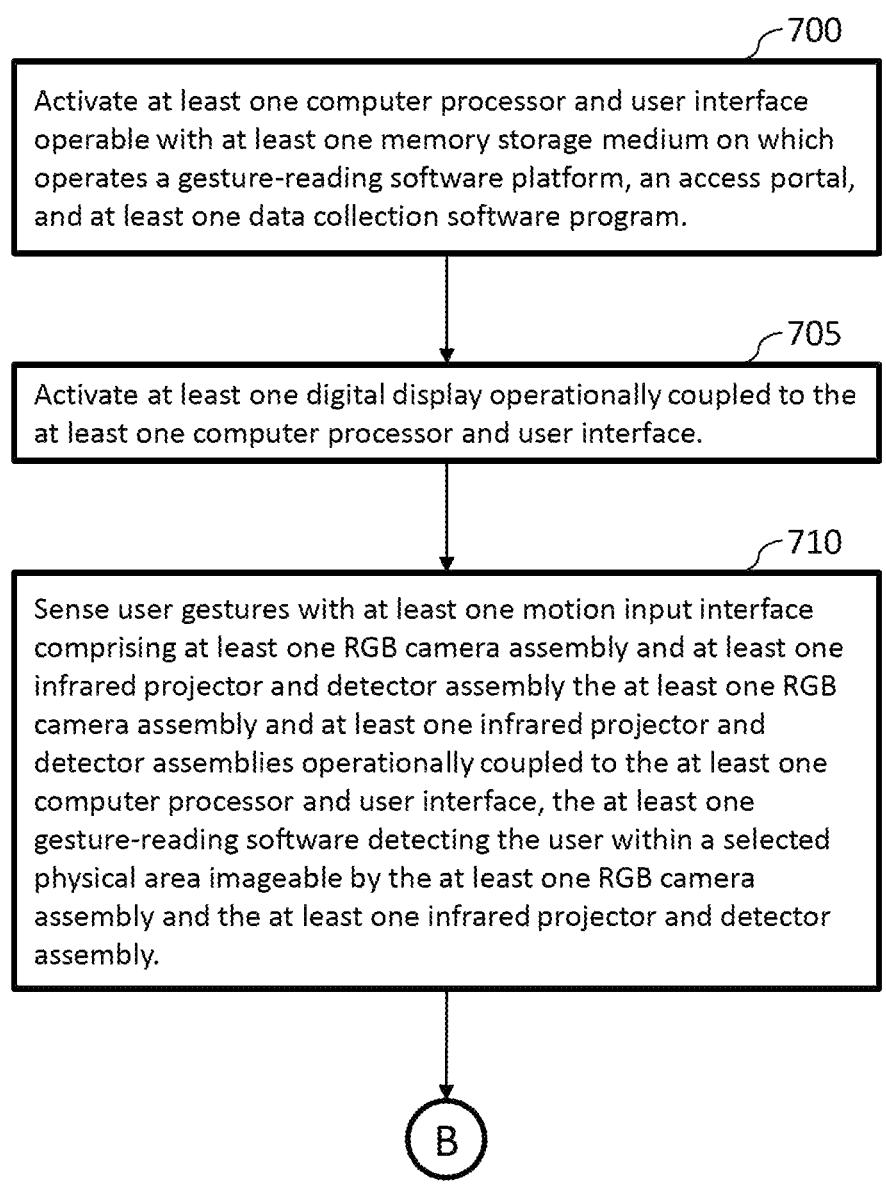
Figure 7D:
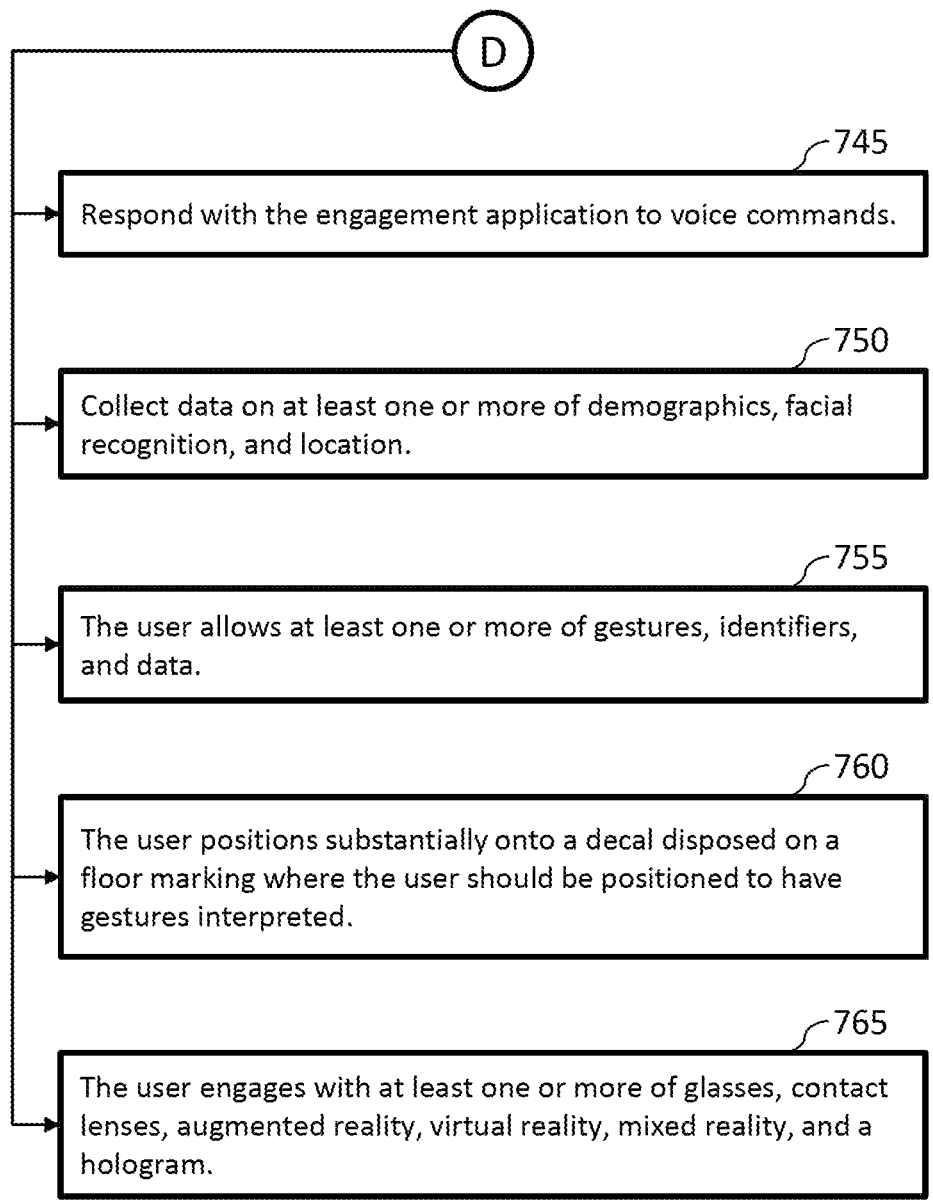

FIGS. 1-4 further illustrates that the access portal 140 has at least one or more of at least one dashboard display 462 designed to display data substantially in real-time, at least one variable advertisement display 460A, and at least one statistical data display 460B designed to display at least one or more of past, present, and forecasted statistical data. The engagement application 130 is designed to at least one or more of manually and autonomously respond to at least one or more user gestures, user commands, data retrieved because of commands, and identifiers associated with at least one or more of the user, the space, the time, the material, the quantity of results, and the quality of results, the response operationally coupling the user to one or more selected end-point commands along at least one command pathway, as illustrated in FIG. 6A-6B, the at least one command pathway presenting at least one additional command option.

FIGS. 1-4 further illustrates that at least one or more of the at least one RGB camera assembly 382 and the at least one infrared projector and detector assembly 384, 386 are designed to follow the user detected within a defined physical area 290 based on at least one or more identifiers 92 from the group of image tracking, electronic tracking, garment tracking, and physical identifiers, the physical identifiers including at least one or more of facial recognition, body shape, and joints.

FIGS. 1-4 further illustrates that in one embodiment of the touchless engagement system, the engagement application is further designed to respond to voice commands. In one embodiment of the touchless engagement system, the collected data includes at least one or more of demographics, facial recognition, and location. In one embodiment, the user must opt in to allowing at least one or more of gestures, identifiers, and data. The touchless engagement system may further include augmented reality, virtual reality, or mixed head-ware 277.

Figure 5:
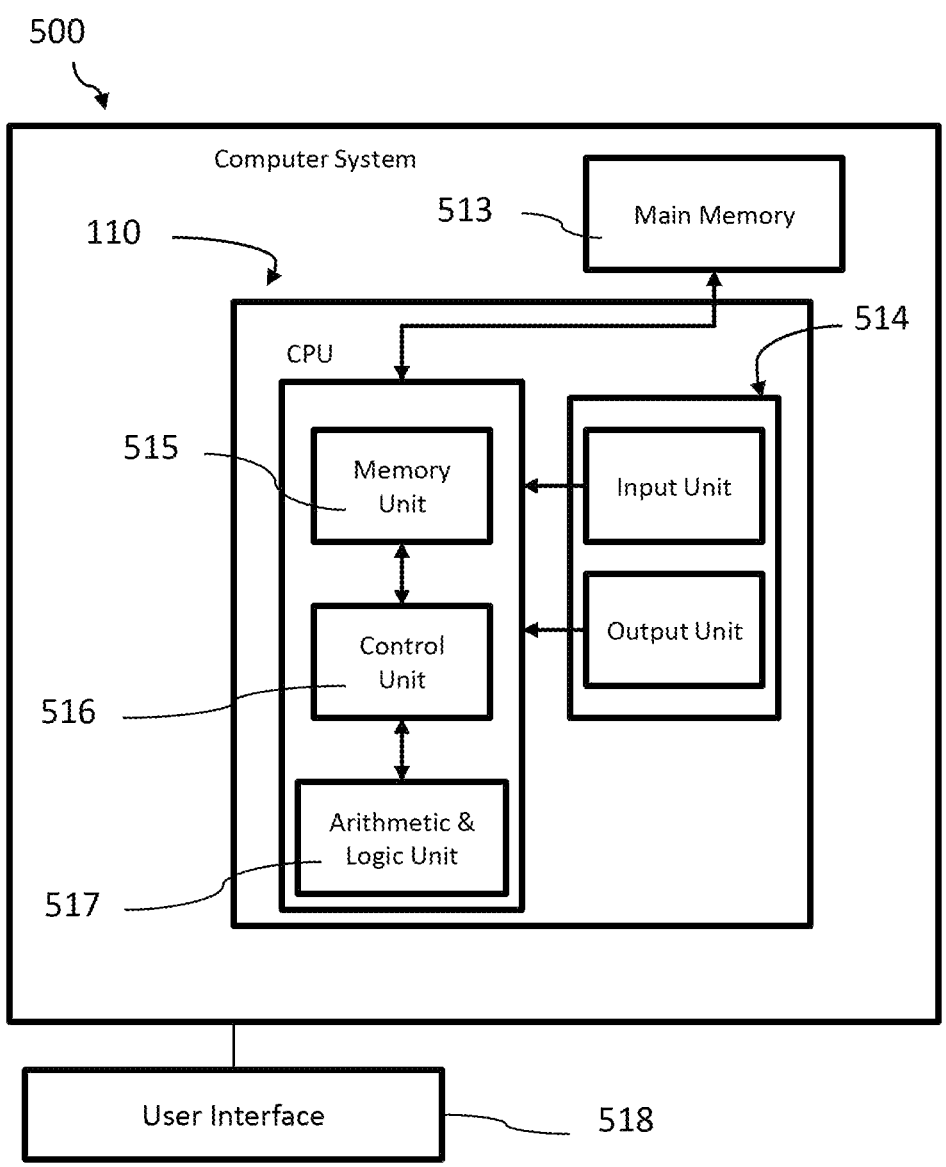
FIG. 5 illustrates a representative computer system.

FIG. 5 illustrates an exemplary computer processor central processing unit (CPU) 510, also called a central processor or main processor, which is the electronic circuitry within the representative at least one computer system 500 that executes instructions that make up a computer program. The CPU 510 performs basic arithmetic, logic, controlling, and input/output (I/O) operations specified by the instructions in the program. An arithmetic and logic unit (ALU) 517 is a combination digital electronic circuit that performs arithmetic and bitwise operations in integer binary numbers. Traditionally, the term CPU 510 refers to a processor, more specifically to its processing unit and control unit (CU) 516, distinguishing these core elements of a computer from external components such as main memory 513 and input output (I/O) circuitry 514. The CPU 510 may also contain memory 515. Memory 515 refers to a component that is used to store data for immediate use in the at least one computer system 500. A user interface 518 is illustrated on this representative embodiment operationally coupled to the at least one central processing unit (CPU) 510 having the at least one memory unit 515.

FIGS. 6A-6B illustrate a representative method 600A-600B for using the touchless engagement system and illustrates the customer perspective of the method and the system perspective of the method. For example, a gesture command of the given user may deliver one result to the given user, such as a new screen, and an associated system result, such as data logging the given user's new screen. In one representative embodiment of the touchless engagement system, the method allows the given user to assess their options, decide which options, and act on those options from a framework of at least one or more of the given user's profile, identifiers, and gestures.

FIGS. 7A-7D illustrate a touchless engagement method for a user that includes the step of 700 activating at least one computer processor and user interface 270 operable with at least one memory storage medium on which operates a gesture-reading software platform 30, an access portal 40, and at least one data collection software program 50. The touchless engagement method for a user further includes the step of 705 activating at least one digital display 460 operationally coupled to the at least one computer processor and user interface 70. The touchless engagement method for a user further includes the step of 710 sensing user gestures with at least one motion input interface 380 comprising at least one RGB camera assembly 382 and at least one infrared projector and detector assembly 384, 386, the at least one RGB camera assembly 382 and at least one infrared projector and detector assemblies 384, 386 operationally coupled to the at least one computer processor and user interface 70, the at least one gesture-reading software detecting the user within a selected physical area 290 imageable by the at least one RGB camera assembly 382 and the at least one infrared projector and detector assembly 384, 386. The touchless engagement method for a user further includes the step of 715 calculating place, time, and trajectory of selected user body parts with an engagement application of the gesture-reading software platform 130 designed, via images from at least one or more of the at least one RGB camera assembly 382 and at least one infrared detector assembly, the user body parts moving to signal commands by the user, the data collection software program 450 collecting data about at least one or more of user gestures, user commands, data retrieved because of commands, and identifiers 92 associated with at least one or more of the user, space, time, material, quantity of results, and quality of results.

FIGS. 7A-7D illustrates that the touchless engagement method for a user further includes the step of 720 manually and autonomously responding, with the engagement application, to at least one or more user gestures, the user gestures interpreted as user commands, and retrieving data because of the commands. The touchless engagement method for a user further includes the step of 725 associating identifiers 92 with at least one or more of the user, the space, the time, the material, the quantity of results, and the quality of results, the response operationally coupling the user to one or more selected end-point commands along at least one command pathway, the at least one command pathway presenting at least one additional command option. The touchless engagement method for a user further includes the step of 730, displaying with the access portal at least one or more of at least one dashboard display, the dashboard displaying data substantially in real-time, at least one variable advertisement display, at least one statistical data display displaying at least one or more of past, present, and forecasted statistical data.

FIGS. 7A-7D illustrate that the touchless engagement method for a user further includes the step of 735 engaging with the at least one RGB camera assembly 382 and the at least one infrared projector and detector assembly 384, 386 a user, the user having stepped substantially onto a decal disposed on a floor defining a physical area 290 where the user should be positioned to have gestures interpreted by the at least one RGB camera assembly 382 and the at least one infrared projector 384 while other people are ignored.

FIGS. 7A-7D illustrate that the touchless engagement method for a user may further include the step of 740 following with the at least one or more of the at least one RGB camera assembly 382 and the at least one infrared projector and detector assemblies 384, 386 the user when the user is detected within a defined physical area 290 based on at least one or more of image tracking, electronic tracking, garment tracking, and physical identifiers 92, the physical identifiers 92 followed including at least one or more of facial recognition, body shape, and joints.

FIGS. 7A-7D illustrate that the touchless engagement method for a user may further include the step of 745 responding with the engagement application to voice commands.

FIGS. 7A-7D illustrate that the touchless engagement method for a user may further include the step of 750 collecting data on at least one or more of demographics, facial recognition, and location.

FIGS. 7A-7D illustrate that the touchless engagement method for a user may further include the step of 750 the user allowing at least one or more of gestures, identifiers 92, and data.

FIGS. 7A-7D illustrate that the touchless engagement method for a user may further include the step of 755 the user positioning substantially onto a decal disposed on a floor marking where the user should be positioned to have gestures interpreted.

FIGS. 7A-7D illustrate that the touchless engagement method for a user may further include the step of 760 the user engaging with at least one or more of glasses, contact lenses, augmented reality, virtual reality, mixed reality, and a hologram.

Various related embodiments of the inventive concept are also described in Appendix A of the provisional application, which is incorporated herein by reference in its entirety. The following patents are incorporated by reference in their entireties: Pat. Nos. CN103713741B, CN103761930A, CN108037843A, CN203350837U, CN207115486U, KR20140075882, KR20160001942, TWM474995Y, U.S. Pat. Nos. 5,534,917, 7,058,204, 8,325,214, 8,373,657, 8,514,251, 8,555,207, 8,559,676, 9,349,131, 9,740,338, 9,772,689, U.S. Ser. No. 11/049,120, and US2014365272.

While the inventive concept has been described above in terms of specific embodiments, it is to be understood that the inventive concept is not limited to these disclosed embodiments. Upon reading the teachings of this disclosure, many modifications and other embodiments of the inventive concept will come to mind of those skilled in the art to which this inventive concept pertains, and which are intended to be and are covered by both this disclosure and the appended claims. It is indeed intended that the scope of the inventive concept should be determined by proper interpretation and construction of the appended claims and their legal equivalents, as understood by those of skill in the art relying upon the disclosure in this specification and the attached drawings.

The invention claimed is:

1. A touchless engagement system for a user comprising:
at least one computer processor and user interface operable with at least one memory storage medium on which operates a gesture-reading software platform, an access portal, and at least one data collection software program;
at least one digital display operationally coupled to the at least one computer processor and user interface;
at least one motion sensing input interface comprising at least one RGB camera assembly and at least one infrared projector and detector assembly, the at least one RGB camera assembly and at least one infrared projector and detector assemblies operationally coupled to the at least one computer processor and user interface, the at least one gesture-reading software platform adapted to detect the user within a selected physical area imageable by the at least one RGB camera assembly and the at least one infrared projector and detector assembly;
an engagement application of the gesture-reading software platform adapted, via images from at least one or more of the at least one RGB camera assembly and at least one infrared detector assembly, to calculate place, time, and trajectory of selected user body parts, the user body parts moved to signal commands by the user, the data collection software program adapted to collect data about at least one or more of user gestures, user commands, data retrieved because of commands, and identifiers associated with at least one or more of the user, space, time, material, quantity of results, and quality of results;
the engagement application adapted to at least one or more of manually and autonomously respond to at least one or more user gestures, user commands, data retrieved because of commands, and identifiers associated with at least one or more of the user, the space, the time, the material, the quantity of results, and the quality of results, the response operationally coupling the user to one or more selected end-point commands along at least one command pathway, the at least one command pathway presenting at least one additional command option; and
the access portal having at least one or more of at least one dashboard display adapted to display data substantially in real-time, at least one variable advertisement display, and at least one statistical data display adapted to display at least one or more of past, present, and forecasted statistical data.

2. The touchless engagement system for a user of claim 1, wherein a decal disposed on a floor defines a physical area where the user should be positioned to have gestures interpreted by the at least one RGB camera assembly and the at least one infrared projector and detector assembly while gestures of other people are ignored.

3. The touchless engagement system for a user of claim 1 wherein at least one or more of the at least one RGB camera assembly and the at least one infrared projector and detector assemblies are adapted to follow the user detected within a defined physical area based on at least one or more of image tracking, electronic tracking, garment tracking, and physical identifiers, the physical identifiers including at least one or more of facial recognition, body shape, and joints.

4. The touchless engagement system for a user of claim 1, wherein the engagement application is further adapted to respond to voice commands.

5. The touchless engagement system for a user of claim 1, wherein the collected data includes at least one or more of demographics, facial recognition, and location.

6. The touchless engagement system for a user of claim 1, wherein the user must opt in to allowing at least one or more of gestures, identifiers, and data.

7. The touchless engagement system for a user of claim 1, wherein a decal disposed on a floor marks on where the user should be positioned to have gestures interpreted while gestures of other people are ignored.

8. The touchless engagement system for a user of claim 1, where the at least one screen assembly is at least one or more of glasses, contact lenses, augmented reality, virtual reality, mixed reality, and a hologram.

9. A touchless engagement method for a user comprising:
activating at least one computer processor and user interface operable with at least one memory storage medium on which operates a gesture-reading software platform, an access portal, and at least one data collection software program;
activating at least one digital display operationally coupled to the at least one computer processor and user interface;
sensing user gestures with at least one motion input interface comprising at least one RGB camera assembly and at least one infrared projector and detector assembly, the at least one RGB camera assembly and at least one infrared projector and detector assemblies operationally coupled to the at least one computer processor and user interface, the at least one gesture-reading software detecting the user within a selected physical area imageable by the at least one RGB camera assembly and the at least one infrared projector and detector assembly;
calculating place, time, and trajectory of selected user body parts with an engagement application of the gesture-reading software platform adapted, via images from at least one or more of the at least one RGB camera assembly and at least one infrared detector assembly, the user body parts moving to signal commands by the user, the data collection software program collecting data about at least one or more of user gestures, user commands, data retrieved because of commands, and identifiers associated with at least one or more of the user, space, time, material, quantity of results, and quality of results;
manually and autonomously responding, with the engagement application, to at least one or more user gestures, the user gestures interpreted as user commands, and retrieving data because of the commands;
associating identifiers with at least one or more of the user, the space, the time, the material, the quantity of results, and the quality of results, the response operationally coupling the user to one or more selected end-point commands along at least one command pathway, the at least one command pathway presenting at least one additional command option; and
displaying with the access portal at least one or more of at least one dashboard display, the dashboard displaying data substantially in real-time, at least one variable advertisement display, at least one statistical data display displaying at least one or more of past, present, and forecasted statistical data.

10. The touchless engagement method for a user of claim 9, the method further including engaging with the at least one RGB camera assembly and the at least one infrared projector and detector assembly a user, the user having stepped substantially onto a decal disposed on a floor defining a physical area where the user should be positioned to have gestures interpreted by the at least one RGB camera assembly and the at least one infrared projector while other people are ignored.

11. The touchless engagement method for a user of claim 9, the method further including following with the at least one or more of the at least one RGB camera assembly and the at least one infrared projector and detector assemblies the user when the user is detected within a defined physical area based on at least one or more of image tracking, electronic tracking, garment tracking, and physical identifiers, the physical identifiers followed including at least one or more of facial recognition, body shape, and joints.

12. The touchless engagement method for a user of claim 9, the method further including responding with the engagement application to voice commands.

13. The touchless engagement method for a user of claim 9, the method further including collecting data on at least one or more of demographics, facial recognition, and location.

14. The touchless engagement method for a user of claim 9, the method further including the user allowing at least one or more of gestures, identifiers, and data.

15. The touchless engagement method for a user of claim 9, the method further including the user positioning substantially onto a decal disposed on a floor marking where the user should be positioned to have gestures interpreted.

16. The touchless engagement method for a user of claim 9, the method further including the user engaging with at least one or more of glasses, contact lenses, augmented reality, virtual reality, mixed reality, and a hologram.

17. A touchless engagement system for a user comprising:
at least one computer processor and user interface operable with at least one memory storage medium on which operates a gesture-reading software platform, an access portal, and at least one data collection software program;
at least one digital display operationally coupled to the at least one computer processor and user interface;
at least one motion sensing input interface comprising at least one RGB camera assembly and at least one infrared projector and detector assembly, the at least one RGB camera assembly and at least one infrared projector and detector assemblies operationally coupled to the at least one computer processor and user interface, the at least one gesture-reading software platform adapted to detect the user within a selected physical area imageable by the at least one RGB camera assembly and the at least one infrared projector and detector assembly;
an engagement application of the gesture-reading software platform adapted, via images from at least one or more of the at least one RGB camera assembly and at least one infrared detector assembly, to calculate place, time, and trajectory of selected user body parts, the user body parts moved to signal commands by the user, the data collection software program adapted to collect data about at least one or more of user gestures, user commands, data retrieved because of commands, and identifiers associated with at least one or more of the user, space, time, material, quantity of results, and quality of results;

the engagement application adapted to at least one or more of manually and autonomously respond to at least one or more user gestures, user commands, data retrieved because of commands, and identifiers associated with at least one or more of the user, the space, the time, the material, the quantity of results, and the quality of results, the response operationally coupling the user to one or more selected end-point commands along at least one command pathway, the at least one command pathway presenting at least one additional command option;

the access portal having at least one or more of at least one dashboard display adapted to display data substantially in real-time, at least one variable advertisement display, and at least one statistical data display adapted to display at least one or more of past, present, and forecasted statistical data;

past data of given users retained but disassociated from data generated by each present use, messages delivered to the user interface calibrated based on present data only;

at least one dashboard display, which reports substantially in real-time that the company has identified a given user for easy tracking and analyses;

ads, which allow businesses to create messages and publish landing page information through templates or by uploading bespoke creative designs; and statistical data capture, which allows the business to access a plurality of available reports related to their message and landing page performance.

18. The touchless engagement system for a user of claim 17 wherein the users opt-in via the user interface to allow facial recognition.

19. The touchless engagement system for a user of claim 17 wherein the user interface presents at least one initial advertisement slide until a user is detected, wherein the advertisement selected may be calculated from aggregate past user data.

20. The touchless engagement system for a user of claim 17 wherein the user interface is at least one or more of presented by augmented reality, virtual reality, and mixed reality.

* * * * *